United States Patent
Colgrove et al.

(10) Patent No.: US 9,940,060 B1
(45) Date of Patent: Apr. 10, 2018

(54) MEMORY USE AND EVICTION IN A DEDUPLICATION STORAGE SYSTEM

(71) Applicant: Pure Storage, Inc., Mountain View, CA (US)

(72) Inventors: John Colgrove, Los Altos, CA (US); Ronald Karr, Palo Alto, CA (US); Ethan L. Miller, Santa Cruz, CA (US); Vinay K. Perneti, Mountain View, CA (US); Cary A. Sandvig, Palo Alto, CA (US); Feng Wang, Sunnyvale, CA (US); Wei Zhang, Santa Clara, CA (US)

(73) Assignee: Pure Storage, Inc., Mountain View, CA (US)

( * ) Notice: Subject to any disclaimer, the term of this patent is extended or adjusted under 35 U.S.C. 154(b) by 53 days.

(21) Appl. No.: 15/331,181

(22) Filed: Oct. 21, 2016

Related U.S. Application Data (60) Provisional application No. 62/330,716, filed on May 2, 2016, provisional application No. 62/330,733, filed on May 2, 2016.

(51) Int. Cl.
G06F 12/00 (2006.01)
G06F 3/06 (2006.01)

(52) U.S. Cl.
CPC ............ *G06F 3/0641* (2013.01); *G06F 3/067* (2013.01); *G06F 3/0608* (2013.01); *G06F 3/0652* (2013.01)

(58) Field of Classification Search
CPC ....... G06F 3/067; G06F 12/123; G06F 3/0655
See application file for complete search history.

(56) References Cited

U.S. PATENT DOCUMENTS

| | | |
|---|---|---|
| 6,286,056 B1 | 9/2001 | Edgar et al. |
| 6,804,703 B1 | 10/2004 | Allen et al. |
| 6,954,881 B1 | 10/2005 | Flynn, Jr. et al. |
| 7,139,907 B2 | 11/2006 | Bakke et al. |
| 7,272,674 B1 | 9/2007 | Nandi et al. |
| 7,313,636 B2 | 12/2007 | Qi |
| 7,577,802 B1 | 8/2009 | Parsons |
| 8,103,754 B1 | 1/2012 | Luong et al. |

(Continued)

OTHER PUBLICATIONS

Ouyang, J. et al. (Mar. 1-5, 2014) "SDF: Software-Defined Flash for Web-Scale Internet Storage Systems", ASPLOS 2014, 14 pages.

(Continued)

*Primary Examiner* — David X Yi
*Assistant Examiner* — Arvind Talukdar
(74) *Attorney, Agent, or Firm* — Womble Bond Dickinson (US) LLP; Daniel Ovanezian (57) ABSTRACT

The method includes storing data including an index summary (IS) and a deduplication map (DDM) in volatile memory of a deduplication system. The method also includes detecting that the stored data exceeds a data allocation size limit for the volatile memory. The method includes evicting the data from the volatile memory using a memory eviction policy to meet the data allocation size limit. The method further includes performing a first eviction by evicting the DDM levels from an oldest DDM level to a newest DDM level until a first one of the data allocation size limit or a DDM threshold is met. The method also includes performing a second eviction by evicting the IS levels from an oldest IS level to a newest IS level until a first one of the data allocation size limit or IS threshold is met in response to the data allocation size limit not being met by the first eviction.

20 Claims, 5 Drawing Sheets

(56) References Cited

U.S. PATENT DOCUMENTS

| | | |
|---|---|---|
| 8,301,811 B1 | 10/2012 | Wigmore et al. |
| 8,645,649 B2 | 2/2014 | Kaiya et al. |
| 9,063,937 B2 | 6/2015 | McDowell et al. |
| 9,294,567 B2 | 3/2016 | Hussain et al. |
| 9,430,412 B2 | 8/2016 | Huang |
| 9,501,245 B2 | 11/2016 | Hussain et al. |
| 9,565,269 B2 | 2/2017 | Malwankar et al. |
| 2008/0034167 A1 | 2/2008 | Sharma et al. |
| 2015/0019798 A1 | 1/2015 | Huang |
| 2017/0024166 A1 | 1/2017 | Singh et al. |

OTHER PUBLICATIONS

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

MEMORY USE AND EVICTION IN A DEDUPLICATION STORAGE SYSTEM

RELATED APPLICATIONS

The present application claims the benefit of U.S. Provisional Patent Application No. 62/330,716, filed May 2, 2016, and also claims the benefit of U.S. Provisional Patent Application No. 62/330,733 filed May 2, 2016, both of which are incorporated by reference herein.

BACKGROUND

Data deduplication is a process to eliminate or remove redundant data to improve the utilization of storage resources. For example, during the data deduplication process, blocks of data may be processed and stored. When a subsequent block of data is received, the subsequent block of data may be compared with the previously stored block of data. If the subsequent block of data matches with the previously stored block of data, then the subsequent block of data may not be stored in the storage resource. Instead, a pointer to the previously stored block of data may replace the contents of the subsequent block of data.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

The data deduplication process may include a background data deduplication process and an inline data deduplication process. In background data deduplication (which also may be referred to as "background deduplication" or "post-processing data deduplication" herein), a storage system including any persistent storage resources (which also may be referred to as "storage resource" herein) are scanned to detect duplicate data blocks within the storage system. Background deduplication may occur after data blocks are stored in the storage system. Inline data deduplication (which also may be referred to as "inline deduplication" herein) may be performed as new data blocks are received or prior to storing the received data blocks in a storage resource (e.g., storage resources using solid-state non-volatile memory such as flash). For example, a data block is received and analyzed before being stored in a storage resource. The inline deduplication process may determine whether a copy of the received data block is already stored in the storage resource before storing the received data block in the storage resource. Thus, the inline deduplication process may be performed as a stream of data blocks is received prior to being stored in the storage resource.

As data blocks are received by a data deduplication system (which also may be referred to as "deduplication system" herein), data stored in volatile memory (e.g., cache memory) may be used to help accelerate the detection of received data blocks that are already stored in the persistent storage resource. For instance, rather than comparing a hash value of a received data block to every hash values (of data blocks) stored in the persistent storage resource, an index summary and deduplication map stored in volatile memory may be used to efficiently determine if the received data block is currently stored in the persistent storage resource.

Space available in volatile memory to store the index summary or deduplication map may be limited by physical constraints or allocation constraints, for example. The index summary and deduplication map correspond to and help identify data blocks stored in persistent storage. As the number of data blocks stored in the persistent storage resource increases, the size of the index summary and deduplication map also increases. Expanding the capacity of volatile memory to store a larger index summary and deduplication map may not always be feasible. A determination may be made as to what portion of the index summary or deduplication map is to be kept in volatile memory and what portion of the index summary or deduplication map is to be evicted. The determination of storing or evicting portions of the index summary or deduplication map from volatile memory may be particularly challenging. For instance, customers or designers of a data deduplication system may desire to maintain a high rate of efficacy for a data deduplication process, such as inline data deduplication, with a limited data allocation size in volatile memory.

Aspects of the present disclosure address the above-mentioned and other deficiencies by evicting deduplication map levels and index summary levels using a memory eviction policy (also referred to as "eviction policy" herein) to meet a data allocation size limit of volatile memory. The eviction policy may include performing a first eviction by evicting deduplication map levels from the oldest deduplication map level to the newest deduplication map level until a first one of the data allocation size limit or deduplication map threshold is met. Responsive to the data allocation size limit not being met by the first eviction, a second eviction may be performed by evicting index summary levels from the oldest index summary level to the newest index summary level until a first one of the data allocation size limit or index summary threshold is met.

Accordingly, aspects of the present disclosure allow for a data deduplication system to selectively determine to store some index summary levels or some deduplication map levels in volatile memory and evict other index summary levels or deduplication map levels, while maintaining a high level of efficacy of data deduplication. As compared to using other eviction techniques, the eviction policies provided by aspects of the present disclosure significantly simplify and improve the data deduplication process in environments where the allocation of volatile memory to the data deduplication process may be constrained.

Figure 1:
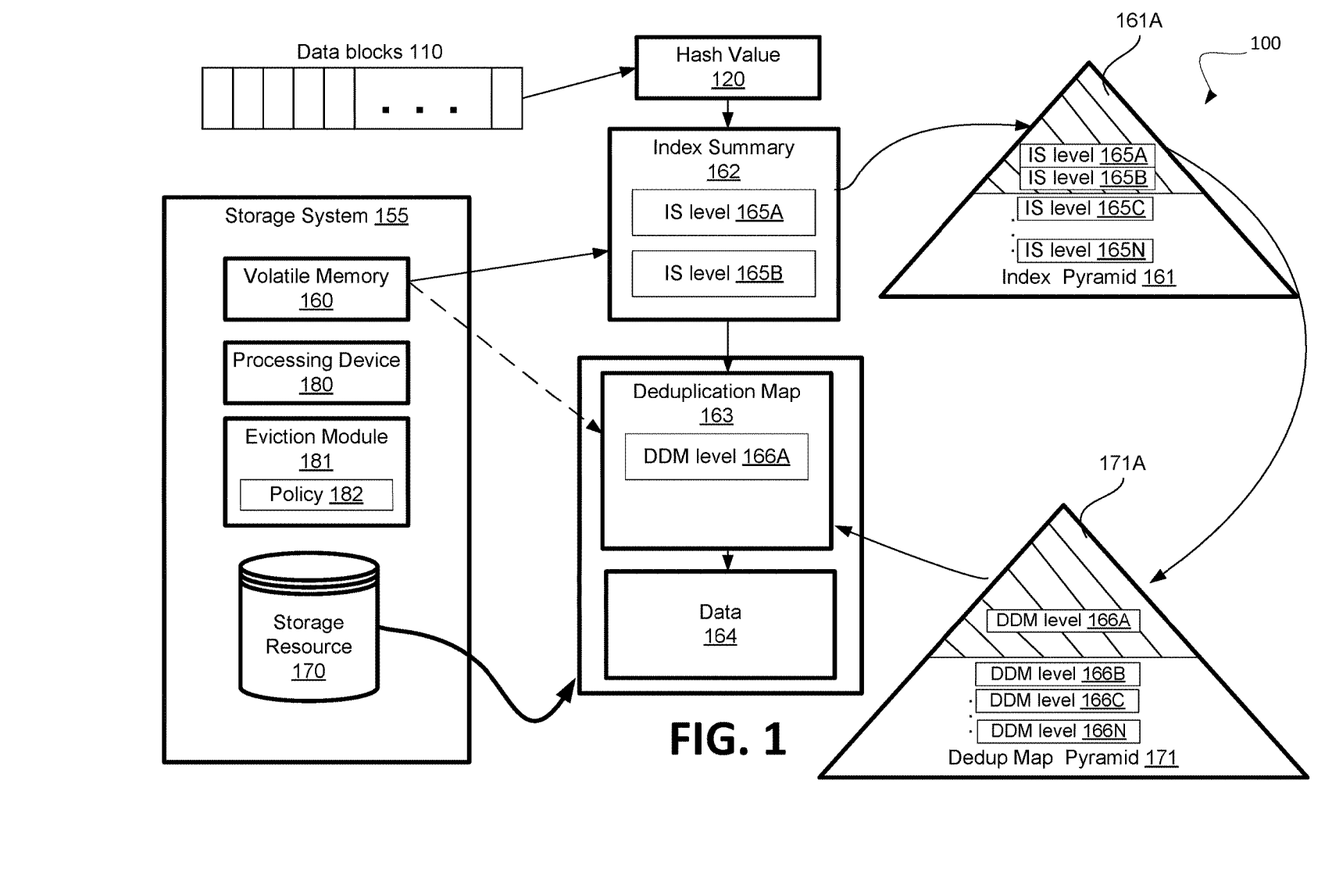
FIG. 1 illustrates an example system architecture for a data deduplication system implementing an eviction module, in accordance with some implementations.

FIG. 1 illustrates an example system architecture for data deduplication system 100 implementing an eviction module 181, in accordance with some implementations. Storage system 155 may include a volatile memory 160, a persistent storage resource 170, a processing device 180, and an eviction module 181 that includes an eviction policy 182. Processing device may execute the eviction module 181 to perform operations of eviction policy 182. It may be noted the functionality attributed to a particular component can be performed by different or multiple components operating together.

The persistent storage resource 170 may correspond to non-disk storage media. For example, the persistent storage resource 170 may be one or more solid-state drives (SSDs), flash memory based storage, any type of solid-state non-volatile memory, or any other type of non-mechanical storage device. In some implementations, the persistent storage resource 170 may be a storage device that includes a flash memory. Volatile memory 160 (also referred to as "cache" or cache memory" herein) may include random access memory (RAM) (e.g., dynamic RAM (DRAM) or static RAM (SRAM) or on-chip cache RAM of processing device 180).

In one implementation, the storage system 155 may receive data blocks 110 and store the data blocks 110 in the persistent storage resource 170 after performing an inline deduplication process using the index summary 162 and the deduplication map 163 to determine whether the persistent storage resource 170 currently stores data 164 that includes a copy of a received data block 110. The deduplication map 163 may store hash values for data blocks that are stored in the data 164 at the persistent storage resource 170. The index summary 162 may be used to identify a part of the hash values stored at the deduplication map 163. For example, with respect to an index pyramid 161 where a top portion 161A of the index pyramid 161 represents data blocks (or corresponding index summary levels of the data blocks) that are more recently received when compared with the bottom portion. The index summary 162 may include partial hash values (also referred to as "hash value signatures" herein) for the data blocks more recently received by the storage system 155. The deduplication map 163 may include complete hash values for some or all of the data blocks that are currently stored in the data 164 in the persistent storage resource 170.

In one implementation, a stream of data blocks 110 may be received from, for example, a client device (not shown). A transformation component (not shown) may use the stream of data blocks 110 in a hash function to generate one or more hash values 120. The hash function may transform the data block of an arbitrary size to data of a fixed size, such as 128-bit. In some implementations, the stream of data blocks 110 may be a series of data blocks that are to be stored at storage resources 170 managed by the storage system 155. The transformation component may perform a transformation using for example, a hash function, on each data block of the stream of data blocks 110 to generate corresponding hash values 120 before determining whether to store the data block at the persistent storage resource 170. If the corresponding hash values matches previously stored hash values, the contents of the data blocks 110 may be a copy of contents of a previously received data blocks. Instead of storing the contents of the data blocks 110, a pointer to the previously received data blocks with the matching hash values may be used to replace the contents of the subsequent data blocks.

In one implementation, the resulting hash values 120 may be compared with other hash values stored in index summary levels 165 of the index summary 162 in volatile memory 160 to determine whether a copy of the data blocks 110 is currently stored in the persistent storage resource 170. The hash values stored in index summary 162 may be partial hash values of for example, 40-50 bits. In one implementation, if the hash values 120 are not found in index summary 162, the storage system 155 determines the stream of data blocks 110 have not been previously stored and stores those data blocks 110 in persistent storage resource 170. If the hash values 120 are found in an index summary level 165 of the index summary 162, storage system 155 checks a page in a corresponding deduplication map level 166 to find the complete hash values, such as the 128-bit hash value, and the physical location of the data 164. In some implementations, if the hash values 120 are found in corresponding deduplication map level 166, the storage system 155 determines that the data blocks 110 are already stored in persistent storage resource 170 and does not store data blocks 110.

A deduplication map 163 may include one or more deduplication map levels 166. A deduplication map level 166 may refer to a data structure, such as a table with rows (also referred to as "entries" herein). The data of a deduplication map level 166 may be evenly distributed. In some implementations, evenly distributed may refer to the statistical likelihood that the generated hash value (e.g., keys) for an input text is the same between any two equally distant values. Given a sufficiently large population of hash values, there may be no biased tendency toward any sub-ranges of values, nor may there be any biased tendency toward any particular bit patterns. As a result, if a sufficiently large population of hash values are sorted into equal size hash value range buckets or equal sized bit pattern subsets, the number of values sorted into each bucket or subset may be roughly the same. For example, if a 128-bit hash value space is divided into 65536 buckets, based on the first 16 bits of the hash value space (or a specific middle 16 bits, or the last 16 bits, for example), then a large population of different generated hash values (much, much larger than 65536) should result in similar numbers of those different generated hash values being assigned to each of those buckets. Statistically random variation in actual hash values can arbitrarily deviate from these expectations, but algorithms should be chosen such that this is unlikely.

The rows may define a value (also referred to as a "key" herein), such as a complete hash value (also referred to as a "hash value" herein), for a data block. The row may also identify a location of the data block (also referred to as a "value of a key-value pair" associated with the key), such as an address in the persistent storage resource 170. The deduplication map level 166 may be sorted by value (e.g., key) and held in volatile memory 160 or stored in pages of persistent storage resource 170 in some grouping, segmenting, or vectoring that orders and relates the portions of the pages of the deduplication map level 166 together in an efficient manner. In some implementations, a page may be a smallest unit of memory that may be programmed (e.g., written to) in the persistent storage resource 170.

For purpose of illustration, deduplication map 163 illustrates the deduplication map levels (e.g., deduplication map level 166A) stored in volatile memory 160 of storage system 155. It may be noted that some, all, or none of the deduplication map levels 166 may be stored in volatile memory 160. In some implementations, the deduplication map levels 166 stored in volatile memory 160 or a persistent storage resource 170 may change or otherwise be altered with the implementation of an eviction policy 182 by eviction module 181, described herein.

In some implementations, a deduplication map pyramid 171 may refer to a specific layering of multiple data structures, such as deduplication map levels 166. A layer or level of the deduplication map pyramid 171 may refer to a specific deduplication map level 166. The deduplication map pyramid 171 may include the aggregate of all deduplication map levels 166 associated with storage system 155 and stored in persistent storage resource 170. In some implementations, newer entries may be store at higher levels of the deduplication map pyramid 171, and older entries may be stored at lower levels of the deduplication map pyramid 171. The highest entry or group of highest entries may be referred to as the "top" of the deduplication map pyramid 171 (e.g., entries in top index summary level 165A or index summary levels 165A-B). The lowest entry or group of lowest entries may be referred to as the "bottom" of the deduplication map pyramid 171. In some implementations, rather than a B-tree-like structure where entries in higher levels segment parts of a key space that is expanded in lower levels, levels of deduplication map pyramid 171 have a logical sort-merge relationship, where a specific key may reside at any of one or more levels in the deduplication map pyramid 171. Some or all the levels of the deduplication map pyramid 171 may be searched to perform a lookup operation for a specific key in the deduplication map pyramid 171. In some implementations, a key found in a higher level of deduplication map pyramid 171 takes precedence over an identical key found at a lower level of the deduplication map pyramid 171. In some implementations, discard techniques may be implemented to logically discard entries of the deduplication map pyramid 171 in response to, for example, the physical blocks or logical volume or file content associated with the locations in persistent storage resource 170 for some entries having been overwritten, deleted, or moved. It may be noted that as newer deduplication map 163 levels are moved to the top of the deduplication map pyramid 171, older deduplication map levels 166 percolate towards the bottom of the deduplication map pyramid 171.

In some implementations, the temporal order (e.g., newest to oldest) of deduplication map levels 166 may be determined by a time order of writes of data blocks to persistent storage resource 170. It may be noted that deduplication map levels 166 (e.g., entries of) may be derived from data blocks stored in persistent storage resource 170. The writes of data blocks to persistent storage resource 170 may be responsive to inline deduplication or background data deduplication (e.g., a data block is stored in the persistent storage resource 170 and checked against other data blocks in persistent storage resource 170 to determine data deduplication). In some implementations, as data 164 is written into persistent storage resource 170, a time identifier, such a unique sequence number in a monotonic sequence, may be associated with written data. The temporal order of the data 164 stored in persistent storage resource 170, and the temporal order of deduplication map levels 166 derived from the data 164, may be determined from the unique sequence number. In other implementations, the temporal order of deduplication map levels 166 may be determined by a time order of deduplication of data blocks (e.g., data blocks found to be duplicate) found using background deduplication. A time identifier, similar as described above, may be associated to the deduplicated data blocks and used to determine the temporal order of the data block. It may be noted that the temporal order of deduplication map levels 166 may be determine by a time order of writes or a time order of deduplication in background deduplication or combination of both, in some implementations.

In one implementation, an index summary 162 may include one or more index summary levels 165. An index summary level 165 may correspond to a particular deduplication map level 166, and may at least in part be derived from the associated deduplication map level 166 or the data 164 associated with the deduplication map level 166. An index summary level 165 may refer to a data structure that accelerates lookup into a deduplication map level 166 by indicating a part of a value (e.g., key) located in the deduplication map level 166 or by providing an indication of the location of the value (e.g., key) in the deduplication map level 166. The index summary level 165 may contain a partial value that is or may by derived from a part of a value (e.g., key) located in the deduplication map level 166. The index summary level 165 may rely on the partial value, such as a partial hash value, to lookup the corresponding value (e.g., complete hash value) in the deduplication map level 166. In some implementations, by using a partial value, lookup in the deduplication map level 166 using the index summary level 165 may not be definitive and may yield false positives for whether a particular value (e.g., key) is actually associated with the deduplication map level 166. If a lookup of a value (e.g., key) for a received data block 110 in the deduplication map level 166 does not match a partial value in the index summary level 165, the value is definitely not in the deduplication map level 166. Lookups in an index summary level 165 do not yield false negatives that would incorrectly identify that a value is not in the corresponding deduplication map level 166. If a value of a received data block (e.g., hash value 120 for a received data block 110) matches a partial value in the index summary level 165, information within or related to the index summary level 165 may be used to narrow the search for entries in the deduplication map level 166. Parameters for configuring an index summary level 165 may be set to trade off memory overhead or search overhead for the rate at which a lookup of a value in deduplication map level 166 will yield a false positive. The false positive rate may depend on the organization of the index summary level 165 (e.g., the number of bits used to represent an entry in the deduplication map level 166) and the distribution and number of values (e.g., keys) in the deduplication map level 166.

For purpose of illustration, index summary 162 illustrates the index summary levels 165A and 165B stored in volatile memory 160 of storage system 155. It may be noted that some, all, or none of the index summary levels 165 may be stored in volatile memory 160. In some implementations, the index summary levels 165 stored in volatile memory 160 or a persistent storage resource 170 may change or otherwise be altered with the implementation of an eviction policy 182 by eviction module 181, described herein.

In some implementations, index pyramid 161 may refer to a specific layering of multiple data structures, such as index summary levels 165. A layer or level of index pyramid 161 may refer a specific index summary level 165. The index pyramid 161 may include the aggregate of all index summary levels 165 associated with storage system 155. The index pyramid 161 may be stored in persistent storage resource 170. As noted above, index summary levels 165 correspond to particular deduplication map levels 166, and may be derived at least in part using the corresponding deduplication map levels 166 or associated data 164 is persistent storage resource 170. For example, index summary level 165A corresponds to deduplication map level 166A, and index summary level 165B corresponds to deduplication map level 166A, and so forth. In some implementations, similar as described above with respect to deduplication map levels 166, newer entries (e.g., entries of the index summary level 165 may correspond to entries in a deduplication map level 166) may be store at higher levels of the index pyramid 161, and older entries are stored at lower levels of the deduplication map pyramid 171. The highest entry or group of highest entries (in one more index summary levels 165) may be referred to as the "top" of the index pyramid 161. The lowest entry or group of lowest entries may be referred to as the "bottom" of the index pyramid 161. Similar as described above with respect to deduplication map levels 166, the temporal order of index summary levels 165 may be determine by a time order of writes or a time order of deduplication in background deduplication or combination of both, in some implementations.

It may be noted that index summary 162 is illustrated as a portion 161A (e.g., shaded portion) of the index pyramid 161. The portion 161A of index pyramid 161, such as index summary 162, may be stored in volatile memory 160 while the index pyramid 161 (including portion 161A) may be stored in persistent storage resource 170. It may be noted that when storage system 155 scales in size, the size of index summary 162 may remain relatively constant and the existing size of volatile memory 160 may also remain constant, thus saving clients from purchasing additional and expensive volatile memory 160. It may also be noted that deduplication map 163 may correspond to a portion 171A (e.g., shaded) of deduplication map pyramid 171. Deduplication map 163 is illustrated as being stored in volatile memory 160 while deduplication map pyramid 171 (including portion 171A) may be stored in persistent storage resource 170. It may be noted that although an index summary level 165 may correspond to a particular deduplication map level 166, both the index summary level 165 and the corresponding deduplication map level 166 may not be stored in volatile memory 160.

In one implementation, processing device 180 may execute eviction policy 182 using eviction module 181. The allocated space in volatile memory 160 (also referred to as "data allocation size" or "data allocation size limit" herein) to store the index summary 162 and deduplication map 163 may be limited. In some implementations, a total amount of volatile memory 160 exists in a system 100. Portions of volatile memory 160 are allocated to one purpose or another, possibly dynamically in response to activity and policies. For example, speeding up background deduplication may require more volatile memory 160 for that activity, thus reducing volatile memory 160 available for other activities. In some implementations, enabling a feature (such as replication) might require that volatile memory 160 be set aside for that feature. In some implementations, some feature (e.g., logical to physical mapping tables) may vary with logical size or physical capacity, and may have to be given precedence over volatile memory 160 set aside for inline deduplication. In some implementations, a budget in volatile memory 160 (e.g., data allocation size limit), at any point in time, is given or adjusted for data deduplication.

The data allocation size may be limited by a policy or by physical constraints, for example. Data most recently written to persistent storage resource 170 may also be data most likely to be written again, and also data likely to be encountered in future data deduplication. Data missed in inline deduplication, but found to be duplicate data in background deduplication may also be data that is likely to be encountered in future data deduplication. The index pyramid 161 and deduplication map pyramid 171, as described above, may be ordered where the top portion 161A of index pyramid 161 and top portion 171A of deduplication map pyramid 171 expresses index summary levels 165 and deduplication map levels 166 for data 164 from newer writes or recently deduplicated data matched in background deduplication. In some implementations, the eviction policy 182 may choose to keep a top portion 161A of index pyramid 161 or a top portion 171A of deduplication map pyramid 171 in volatile memory 160.

In some implementations of the eviction policy 182, storage system 155 may begin storing the index summary 162 and deduplication map 163 in volatile memory 160 of a deduplication system 100. Volatile memory 160 may be stored with multiple index summary levels 165 and deduplication map levels 166 until a data allocation size limit for the volatile memory 160 is exceeded. Eviction module 181 may monitor the volatile memory 160 and detect that the data allocation size limit for the volatile memory 160 has been exceeded. In some implementations, cached deduplication map levels 166 have a size in volatile memory 160, related in some way to how many hash values and block pointers are stored. Cached index summary levels 165 have a size in volatile memory 160 that is roughly related to the number of hash values stored in the corresponding deduplication map level 166. The size per entry in an index summary level 165 depends in general on how much of each hash value is used to represent a partial match to a complete value. In implementations, entries in an index summary level 165 may represent parts of a matching key without storing those bits, or store fewer bits than are actually matched, but there is still an amount of overhead per entry, which might be in the range of 8 bits to 16 bits in some examples. In another example, a deduplication map level 166 encoding 100,000 entries might lead to somewhere between 100,000 and 200,000 bytes being allocated for its corresponding index summary level 165. In some implementations, the deduplication map level 166 may directly encode 16 bytes per key plus 16 bytes per block pointer, as an example, resulting in 32 bytes per entry. For example, the entries index summary level 165 may be between $\frac{1}{16}^{th}$ to $\frac{1}{32}^{nd}$ as large as the entries in the corresponding deduplication map level 166.

In response to detecting that the data allocation size limit of volatile memory 160 has been exceeded, eviction module 181 may execute eviction policy 182 to evict the store data from the volatile memory 160 to meet the data allocation size limit. The eviction module 181 executing eviction policy 182 may perform a first eviction by evicting the deduplication map levels 166 from an oldest deduplication map level 166 to a newest deduplication map level 166 until a first one of the data allocation size limit or a deduplication map threshold is met. A deduplication map threshold may be criteria for an amount of deduplication map levels 166 to keep in volatile memory 160. For example, the deduplication map threshold may be set to an integer number of deduplication map levels 166. The deduplication map threshold may be set by an administrator, for example. In response to the data allocation size limit not being met by the first eviction, eviction module 181 executing eviction policy 182 may perform a second eviction by evicting the index summary levels 165 from an oldest index summary level 165 to a newest index summary level 165 until a first one of the data allocation size limit or index summary threshold is met. In some implementations, a top deduplication map level 166 is created as part of some batch process that groups together new entries as they come in, closes it out at some point (after, say, a few thousand entries) and then creates a corresponding index summary level 165. The aforementioned deduplication map level 166 and index summary level 165 become the top level. In some implementations, a next top level may be implied by an amount of active data in a new deduplication map level 166 in the middle of being constructed and which has not been closed and summarized yet (e.g., corresponding index summary level 165 has not yet been created). After is the new deduplication map level 166 is closed, another deduplication map level 166 is started and eventually closed. This results in two new deduplication map levels 166, one being older than the other. Over time, dozens of deduplication map level 166 levels or more are generated, and system 100 takes some deduplication map levels 166 and merges them together in the flattening process. Flattening rebuilds some number of adjacent deduplication map levels 166 and replaces them with a single, larger, flattened deduplication map level 166 that essentially represents the "time" between the oldest and the newest levels that were merged into the new flattened level.

An index summary threshold may be criteria for an amount of index summary levels 165 to keep in volatile memory 160. For example, the index summary threshold may be set to an integer number of index summary levels 165. The index summary threshold may be set by an administrator or policy that balances available volatile memory 160 to achieve various performance or feature goals, for example. Responsive to the data allocation size limit not being met by the second eviction, eviction module 181 executing the eviction policy 182 may perform a third eviction by evicting the deduplication map levels 166 from the oldest deduplication map level 166 to the newest deduplication map level 166. Responsive to the data allocation size limit not being met by the third eviction, eviction module 181 executing eviction policy 182 may perform a fourth eviction by evicting the index summary levels 165 from oldest index summary level 165 to the newest index summary level 165.

In some implementations, eviction module 181 may upon detecting that the stored data in volatile memory 160 exceeds the data allocation size limit for the volatile memory 160, evict the deduplication map levels 166 and index summary levels 165 that are older than an age threshold. The age threshold may be indicative of the age (hours, days, etc.) of deduplication map levels 166 or index summary levels 165. For example, the deduplication map levels 166 and index summary levels 165 that exceed 30 days old (e.g., deduplication map levels 166 and index summary levels 165 for data written to the persistent storage resource 170 or deduplicated in background deduplication over 30 days prior) may be first evicted from volatile memory 160. It may be noted that deduplication map levels 166 and index summary levels 165 may have independent age thresholds, and the age threshold may be determined by an administrator or designer. If after evicting the deduplication map levels 166 and index summary levels 165 using the age threshold, the data allocation size limit is not met, eviction policy 182 executing the eviction policy 182 may evict stored data in the volatile memory 160 until the data allocation size limit is met, as described above with respect to eviction policy 182. In another implementation, if after evicting the deduplication map levels 166 and index summary levels 165 using the age threshold, additional memory space is available in volatile memory 160, eviction module 181 executing eviction policy 182 may add index summary levels 165 (newest to oldest) until the data allocation size limit of volatile memory 160 is met.

In some implementations, inline deduplication may be performed on incoming data blocks using only the stored data remaining in view of the eviction using eviction policy 182. In some implementations, inline deduplication may include generating a hash value 120 for a received data block 110. The hash value 120 for the incoming data block 110 may be compared to partial hash values in the index summary 162 stored in volatile memory 160 to determine a match. Responsive to determining a match does not exist using the index summary 162 in volatile memory 160, inline deduplication for the incoming data block 110 may be discontinued and the incoming data block 110 may be stored in persistent storage resource 170. In another implementation, responsive to determining a match exist with the index summary 162 in volatile memory 160, storage system 155 may compare the hash value 120 for the incoming data block 110 to the deduplication map 163 in volatile memory 160, rather than the deduplication map levels 166 stored in persistent storage resource 170. If the corresponding deduplication map level 166 is not in volatile memory 160, storage system 155 may not proceed to check the corresponding deduplication map level 166 in persistent storage resource 170. In some implementations, responsive to determining a match exists with the index summary 162 stored in volatile memory 160, storage system 155 may compare the hash value 120 for the incoming data block 110 to the deduplication map 163 in volatile memory 160. If the corresponding deduplication map level 166 is not in volatile memory 160, storage system 155 may search for the corresponding deduplication map level 166 in persistent storage resource 170.

In some implementations, inline deduplication may use heuristics to performed data deduplication on an incoming data block 110 using the stored data remaining in view of the eviction using eviction policy 182. The data block 110 may be transformed into several hash values 120 (e.g., each 4 kilobyte (KB) of 32 (KB) data block may be transformed into a hash value). If one or more, but not all the hash values 120, match the partial hash values of index summary 162 in volatile memory 160, storage system 155 may determine to look at data in the index summary 162 around the matching partial hash values and expand the search from that point or points.

In some implementations, the result of executing the eviction policy 182 may create an environment where the volatile memory 160 of storage system 155 is entirely or predominately filled with index summary levels 165 of index summary 162. When all or some of the hash values 120 of an incoming data block 110 match with index summary 162 in volatile memory 160, a decision may be made as to whether to perform a lookup in the corresponding deduplication map level 166 in persistent storage resource 170 or to compare some or all of the actual data blocks 110 to data 164 in persistent storage resource 170. The decision to perform a lookup or data compare may be made using a relative cost comparison to perform the two operations. The relative cost comparison may weigh factors such as number of bytes read, input-output (IOs) events to persistent storage resource 170 (e.g., reads or writes), bytes transferred from persistent storage resource 170, time for bitwise comparison of all or part of data block 110 to data 164 in persistent storage resource 170, or central processing unit (CPU, e.g., processing device 180) overhead. In some implementations, when some or all of the hash values 120 of an incoming data block 110 match with index summary 162 in volatile memory 160, lookup may be performed in corresponding deduplication map levels 166 that are also in volatile memory 160. If none of the corresponding deduplication map levels 166 are in volatile memory 160, a subset of hits in index summary 162 in volatile memory 160 may be further investigated by reading or loading the corresponding deduplication map levels 166 (or relevant portions (e.g., pages) of the corresponding deduplication map levels 166) into memory and performing the lookup.

In some implementations, deduplication map levels 166 or index summary levels 165 may be partially cached in volatile memory 160. For example, if there is a hit in an index summary level 165 in volatile memory 160 and the corresponding deduplication map level 166 or page(s) of the corresponding deduplication map level 166 are not in volatile memory 160, the lookup handling policy (e.g., inline deduplication) may treat the situation as if a match was determined using a corresponding deduplication map level 166 in volatile memory 160 (and without actually performing a lookup in the corresponding deduplication map level 166).

In some implementations, an incoming write includes multiple data blocks. At least two hash values for differing subranges of the incoming write may be generated. If one hash value matches a deduplication map level 166 in volatile memory 160, and the other hash value matches (or not) to a deduplication map level 166 not in volatile memory 160, system 100 may favor using the match that corresponds to the deduplication map level 166 in volatile memory 160 in performing data deduplication.

Although aspects of the present disclosure relate to inline data deduplication, the disclosure herein may be applied to background (e.g., post-processing) data deduplication that may be used to analyze data blocks currently stored on a persistent storage resource 170.

Figure 2:
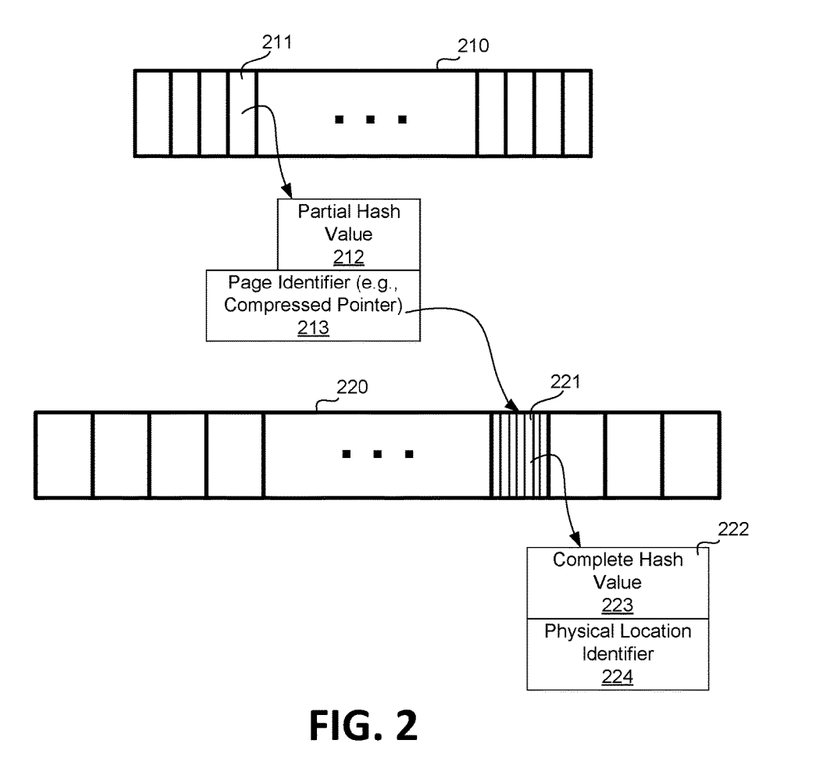
FIG. 2 illustrates an example use of an index summary, in accordance with some implementations.

FIG. 2 illustrates an example use of an index summary, in accordance with some implementations. In one implementation, a first data structure, such as an index summary level 210, may be part of an index summary, such as index summary 162 with respect to FIG. 1. It may be noted that, for purposes of illustration, elements described with respect to FIG. 1 may be reference herein. Index summary level 210 may be used to identify a part of a value in a second data structure, such as a deduplication map level 220. In one implementation, index summary level 210 may be stored in a volatile memory 160, such as a Dynamic Random Access Memory (DRAM) (e.g., a cache of a computing system or a storage controller of a flash storage array system) and the deduplication map level 220 may be stored in the persistent storage resource 170 (e.g., an SSD). In another implementation, a deduplication map level 220 may be stored in volatile memory 160. The index summary level 210 may identify a part of a value of the deduplication map level 220. For example, the index summary level 210 may include multiple entries 211 where each entry 211 includes a partial hash value 212 and a page identifier 213 (e.g., a compressed pointer and/or prefix table, etc.) that points to a location or page in the deduplication map level 220. For instance, the entries 211 of the index summary level 210 may identify a different partial hash value 212 and possibly a different page identifier 213 that points to a different location or page in the deduplication map level 220. In some examples, the complete hash value 223 may be a 128 bit size. The partial hash value 212 may be a part of the 128 bits of the complete hash value 223 (e.g., 40 bits of the 128 bits). The deduplication map level 220 may include multiple pages 221. Each of the pages 221 may include multiple entries 222 where each entry 222 includes a complete hash value 223 and a physical location identifier 224 of a data block stored in persistent storage resource 170. Each entry 222 of the pages 221 may include a different complete hash value 223.

In operation, a data block 110 may be received to be stored at a persistent storage resource 170. In response to receiving the data block 110, a deduplication process may be performed with the data block 110 to determine whether a copy of the data block has already been stored at the persistent storage resource 170. If the data block 110 is already stored at the persistent storage resource 170, then the data block 110 may be stored by creating a pointer to a physical location of the copy of the data block 110. The deduplication process may perform a hash function on the data block 110 to generate a hash value 120. A part of the hash value 120 may be compared with the partial hash values 212 that are stored in the index summary level 210. If the part of the hash value 120 does not match with any of the partial hash values 212 currently stored in the index summary level 210 (or other index summary levels 165 of index summary 162), then a copy of the received data block 110 may not already be stored in the persistent storage resource 170. As such, the received data block 110 may be stored in the persistent storage resource 170, and the index summary level 210 and the deduplication map level 220 may be updated or recreated to register the received data block 110. For example, an entry 222 of the deduplication map level 220 may be modified to include the hash value 120 of the data block 110 and a physical location identifier 224 of the data block 110 is persistent storage resource 170. Otherwise, if the part of the hash value 120 matches with a partial hash value 212 that is stored in the index summary level 210, then the corresponding page 221 of the deduplication map level 220 that is identified by the page identifier 213 of the entry 211 with the matching partial hash value 212 may be retrieved. Each entry 222 in the page 221 may be searched to determine whether the hash value 120 of the data block 110 is currently included in one of the entries 222 of the page 221. If the hash value 120 of the received data block 110 is not included in one of the entries 222, then a copy of the data block 110 may not currently be stored in the persistent storage resource 170. The data block 110 may be stored in the persistent storage resource 170, an entry 222 of the deduplication map level 220 may be modified to register the data block 110 by including the hash value 120 of the data block 110 and the physical location in the persistent storage resource 170 where the data block 110 has been stored. The corresponding index summary level 165 may also be modified. Otherwise, if the hash value 120 of the received data block 110 is included in one of the entries 222 of the deduplication map level 220, then the received data block 110 may be a duplicate or a copy of another data block. The contents of the received data block 110 may not be stored in the persistent storage resource 170 and the received data block 110 may be stored as a pointer to the physical location (e.g., physical location identifier 224) identified by the entry 222 that includes the matching complete hash value 223 of the other data block.

Figure 3:
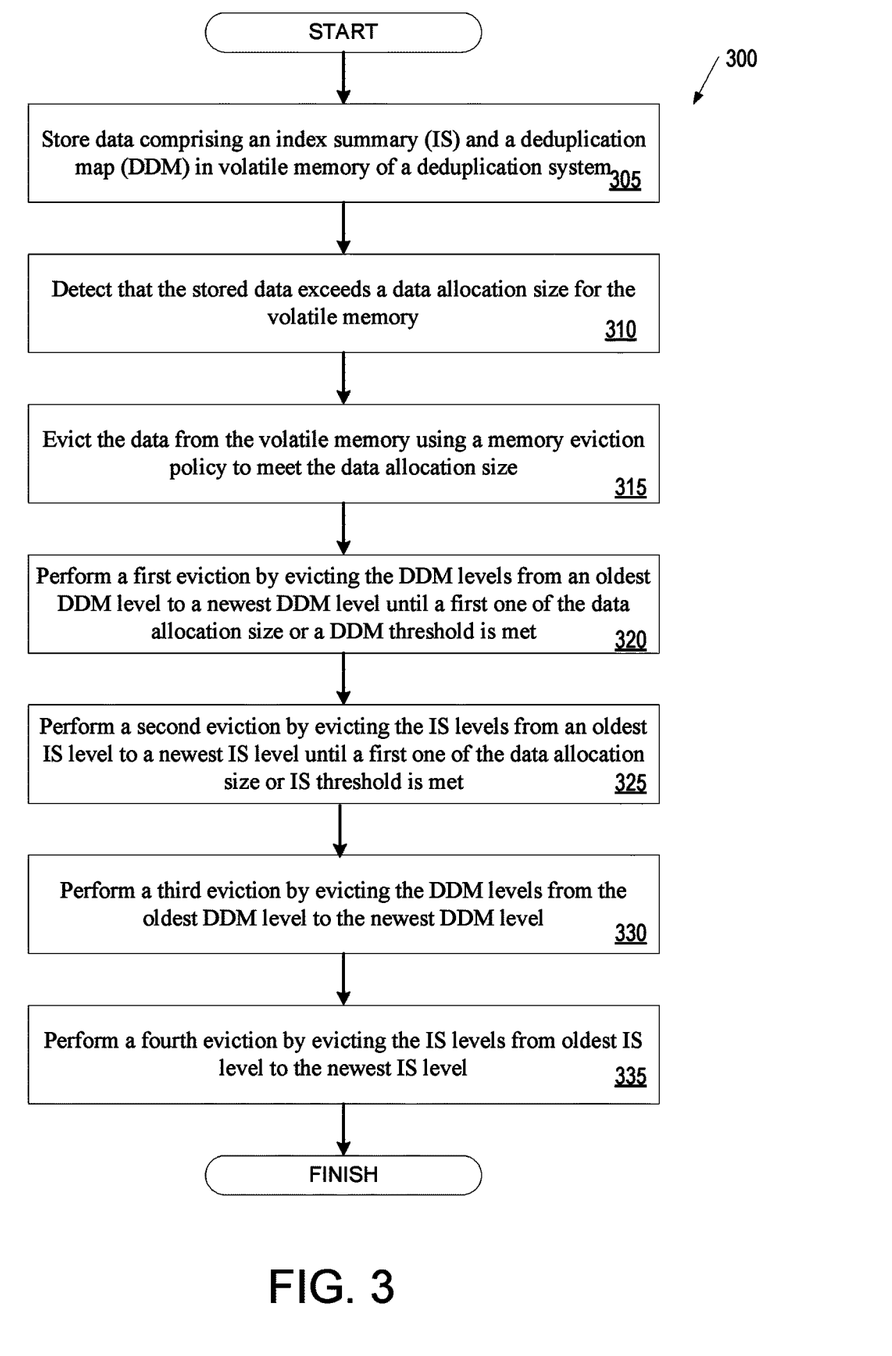
FIG. 3 a flow diagram illustrating data eviction in data deduplication system, in accordance with some implementations.

FIG. 3 a flow diagram illustrating data eviction in data deduplication system, in accordance with some implementations. Method 300 may be performed by processing logic that includes hardware (e.g., circuitry, dedicated logic, programmable logic, microcode), software (e.g., instructions run on a processing device to perform hardware simulation), or a combination thereof. In one implementation, some or all the operations of data eviction in data deduplication system may be performed by eviction module 181 executing eviction policy 182 as described herein.

At block 305, processing logic stores data comprising an index summary (IS) and a deduplication map (DDM) in the volatile memory of the deduplication system. The index summary includes IS levels and accelerates lookup into the deduplication map. The deduplication map includes DDM levels and identifies locations of data blocks in the persistent storage resource of the deduplication system. At block 310, processing logic detects that the stored data exceeds a data allocation size limit for the volatile memory. At block 315, processing logic evicts the data from the volatile memory using a memory eviction policy to meet the data allocation size limit. At block 320, processing logic executing a memory eviction policy performs a first eviction by evicting the DDM levels from an oldest DDM level to a newest DDM level until a first one of the data allocation size limit or a DDM threshold is met. At block 325, processing logic executing a memory eviction policy and responsive to the data allocation size limit not being met by the first eviction, performs a second eviction by evicting the IS levels from an oldest IS level to a newest IS level until a first one of the data allocation size limit or IS threshold is met. At block 330, processing logic executing a memory eviction policy and responsive to the data allocation size limit not being met by the second eviction, performs a third eviction by evicting the DDM levels from the oldest DDM level to the newest DDM level. At block 335, processing logic executing a memory eviction policy and responsive to the data allocation size limit not being met by the third eviction, perform a fourth eviction by evicting the IS levels from oldest IS level to the newest IS level.

Figure 4:
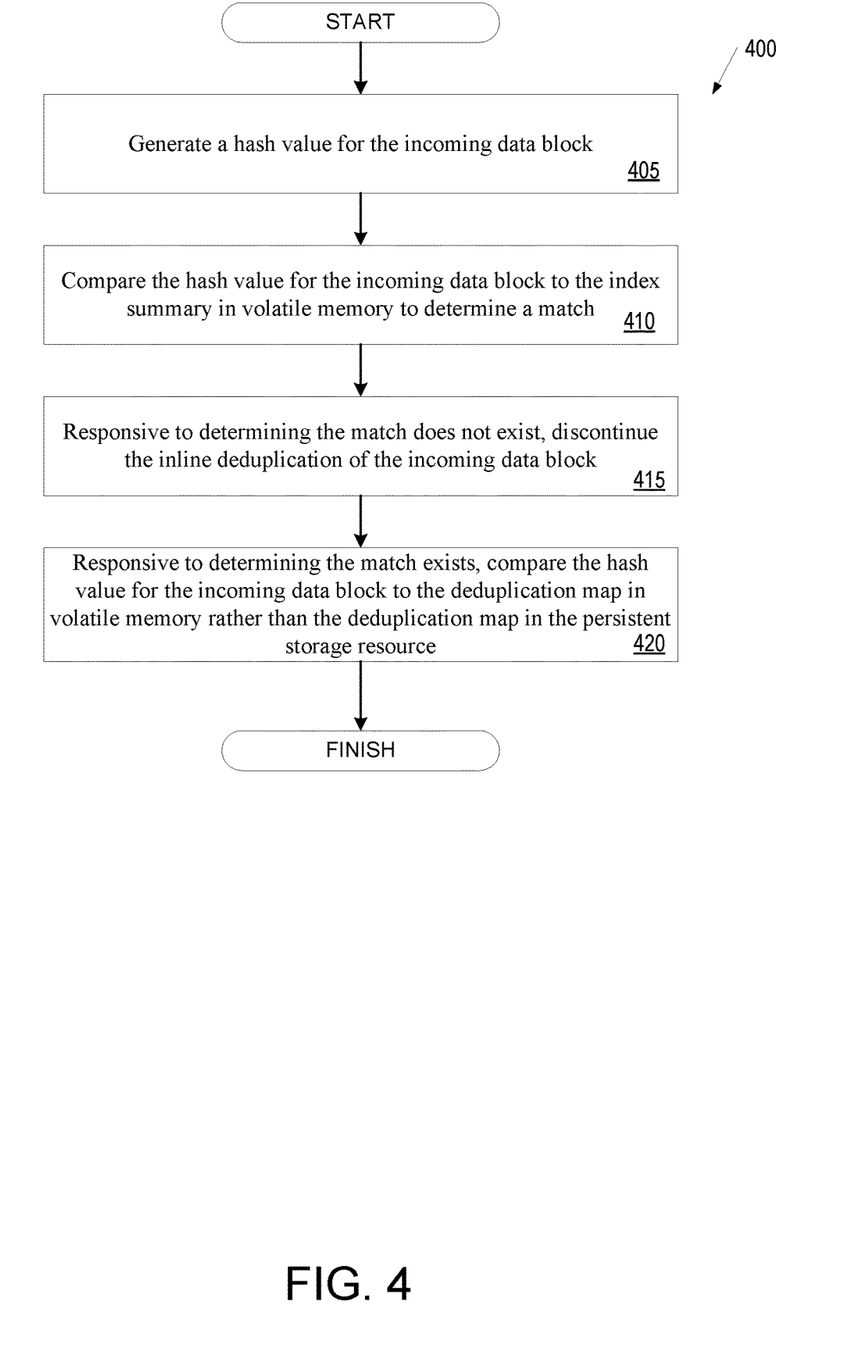
FIG. 4 a flow diagram illustrating data eviction in data deduplication system, in accordance with some implementations.

FIG. 4 a flow diagram illustrating data eviction in data deduplication system, in accordance with some implementations. Method 400 may be performed by processing logic that includes hardware (e.g., circuitry, dedicated logic, programmable logic, microcode), software (e.g., instructions run on a processing device to perform hardware simulation), or a combination thereof. In one implementation, some or all the operations of data eviction in data deduplication system may be performed by eviction module 181 executing eviction policy 182 as described herein.

In method 400, processing logic may perform inline deduplication of an incoming data block using the data remaining in the volatile memory in view of the eviction using the memory eviction policy as described in method 400, for example. At block 405, processing logic generates a hash value for the incoming data block. At block 410, processing logic compares the hash value for the incoming data block to the index summary in volatile memory to determine a match. At block 415, processing logic in response to determining the match does not exist, discontinues the inline deduplication of the incoming data block. At block 420, processing logic in response to determining the match exists, compares the hash value for the incoming data block to the deduplication map in volatile memory rather than the deduplication map in the persistent storage resource.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be noted that the processes disclosed in this specification are capable of being stored on an article of manufacture to facilitate transporting and transferring such processes to computing devices. The term "article of manufacture," as used herein, is intended to encompass a computer program accessible from a non-transitory computer-readable device or storage media.

Figure 5:
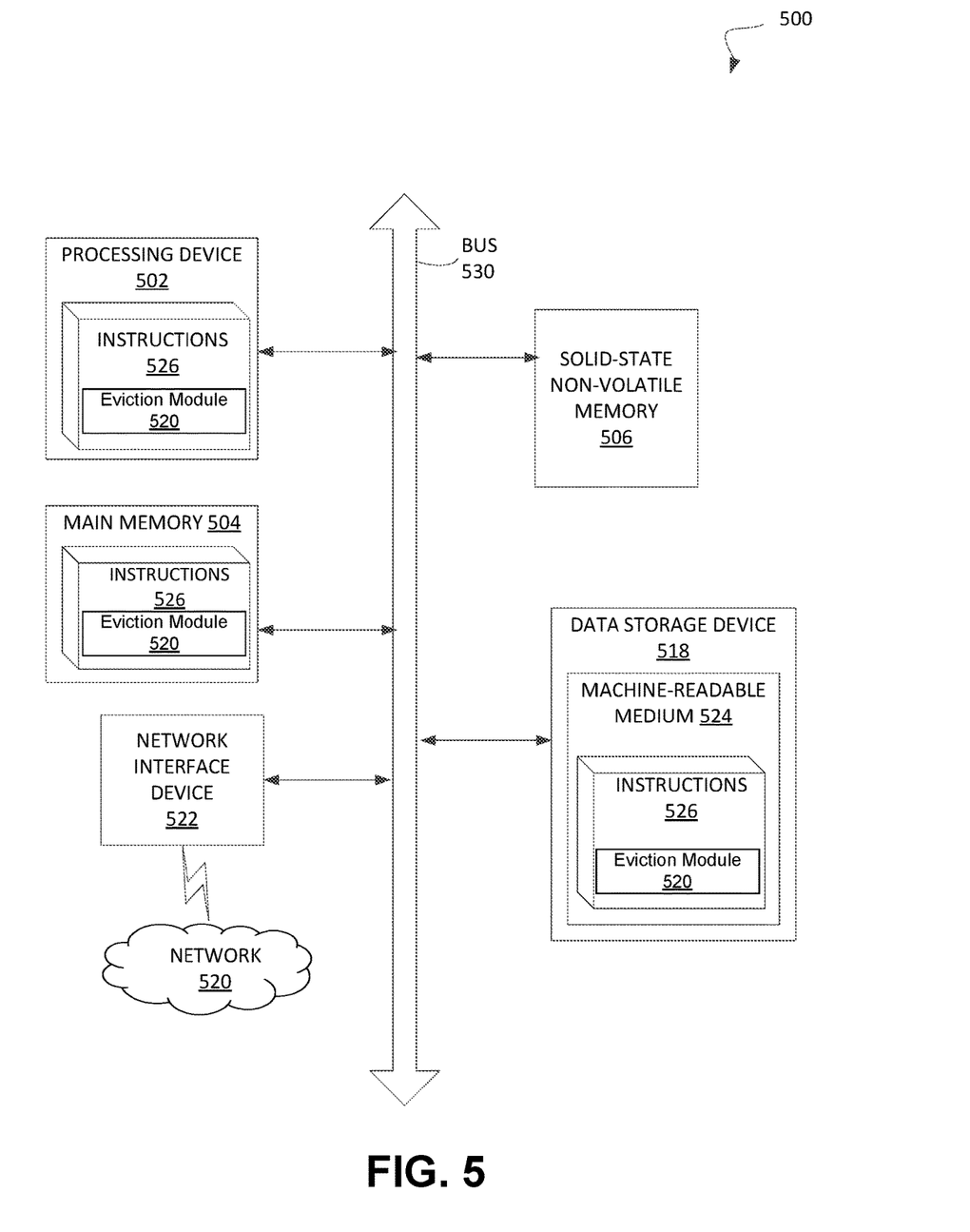
FIG. 5 illustrates an example computer system, in accordance with some implementations.

FIG. 5 depicts an example computer system 500 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a solid-state non-volatile memory 506 (e.g., flash memory, 3D crosspoint (XPoint) memory, magnetoresistive random-access memory (MRAM), or any other such storage media that does not use a physical disk), and a data storage device 518, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute an eviction module 520 (e.g., eviction module 181 executing eviction policy 182 as described with respect to FIG. 1) for performing any of operations and steps discussed herein. The computer system 500 may further include a network interface device 522. The data storage device 518 may include a computer-readable storage medium 524 on which is stored the eviction module 520 embodying any one or more of the methodologies or functions described herein. The eviction module 520 may also reside, completely or at least partially, within the main memory 504 and/or within the processing device 502 during execution thereof by the computer system 500, the main memory 504 and the processing device 502 also constituting computer-readable media. The eviction module 520 may further be transmitted or received over a network via the network interface device 522.

While the computer-readable storage medium 524 is shown in the illustrative examples to be a single medium, the term "computer-readable storage medium" (e.g., "non-transitory computer-readable storage medium") may be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure may, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "storing," "detecting," evicting," "performing," "generating," "comparing," "discontinuing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable storage medium having stored thereon instructions, which may be used to program a computer system (or other electronic devices) to perform a process according to the present disclosure. A machine-readable storage medium includes any method for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   storing data comprising an index summary (IS) and a deduplication map (DDM) in volatile memory of a deduplication system, wherein the index summary comprises IS levels and accelerates lookup into the deduplication map, wherein the deduplication map comprises DDM levels and identifies locations of data blocks in a persistent storage resource of the deduplication system;
   detecting that the stored data exceeds a data allocation size limit for the volatile memory; and
   evicting the data from the volatile memory using a memory eviction policy to meet the data allocation size limit, wherein evicting using the memory eviction policy comprises:
      performing a first eviction by evicting the DDM levels from an oldest DDM level to a newest DDM level until a first one of the data allocation size limit or a DDM threshold is met; and responsive to the data allocation size limit not being met by the first eviction, performing a second eviction by evicting the IS levels from an oldest IS level to a newest IS level until a first one of the data allocation size limit or IS threshold is met.

2. The method of claim 1, wherein evicting using the memory eviction policy further comprises:

responsive to the data allocation size limit not being met by the second eviction, performing a third eviction by evicting the DDM levels from the oldest DDM level to the newest DDM level; and responsive to the data allocation size limit not being met by the third eviction, performing a fourth eviction by evicting the IS levels from oldest IS level to the newest IS level.

3. The method of claim 1, wherein the DDM levels from the oldest DDM level to the newest DDM level are determined by a time order of writes of the data blocks to the persistent storage resource, wherein the writes of the data blocks are responsive to inline deduplication or background deduplication.

4. The method of claim 3, wherein the IS levels from the oldest IS level to the newest IS level are determined by the time order of writes of the data blocks to the persistent storage resource, and wherein the IS levels correspond to the DDM levels of the deduplication map.

5. The method of claim 4, wherein the IS levels from the oldest IS level to the newest IS level and the DDM levels from the oldest DDM level to the newest DDM level are further determined by a time order of deduplication of the data blocks in the background deduplication.

6. The method of claim 1, wherein the IS levels of index summary comprise partial hash values of the data blocks stored in the persistent storage resource, wherein the DDM levels of the deduplication map correspond to the IS levels of the index summary and comprise complete hash values of the data blocks, wherein the index summary accelerates lookup into the deduplication map by linking partial hash values of the index summary to specific areas of the deduplication map used to accelerate a search of the deduplication map for complete hash values and identifiers of the locations of the data blocks in the persistent storage resource of the deduplication system.

7. The method of claim 1, further comprising:

performing inline deduplication of an incoming data block using the data remaining in the volatile memory in view of the eviction using the memory eviction policy.

8. The method of claim 7, wherein performing the inline deduplication of the incoming data block using the data remaining in the volatile memory in view of eviction using the memory eviction policy, further comprises:

generating a hash value for the incoming data block;

comparing the hash value for the incoming data block to the index summary in volatile memory to determine a match; and responsive to determining the match does not exist, discontinuing the inline deduplication of the incoming data block.

9. The method of claim 8, wherein performing the inline deduplication of the incoming data block using the data remaining in the volatile memory in view of eviction using the memory eviction policy, further comprises:

responsive to determining the match exists, comparing the hash value for the incoming data block to the deduplication map in volatile memory rather than the deduplication map in the persistent storage resource.

10. The method of claim 1, wherein the volatile memory is random access memory.

11. A deduplication system comprising:

a persistent storage resource;

a volatile memory; and a processing device, operatively coupled to the persistent storage resource and volatile memory, to:

store data comprising an index summary (IS) and a deduplication map (DDM) in the volatile memory of the deduplication system, wherein the index summary comprises IS levels and accelerates lookup into the deduplication map, wherein the deduplication map comprises DDM levels and identifies locations of data blocks in the persistent storage resource of the deduplication system;

detect that the stored data exceeds a data allocation size limit for the volatile memory; and evict the data from the volatile memory using a memory eviction policy to meet the data allocation size limit, wherein evicting using the memory eviction policy comprises:

perform a first eviction by evicting the DDM levels from an oldest DDM level to a newest DDM level until a first one of the data allocation size limit or a DDM threshold is met; and responsive to the data allocation size limit not being met by the first eviction, perform a second eviction by evicting the IS levels from an oldest IS level to a newest IS level until a first one of the data allocation size limit or IS threshold is met.

12. The deduplication system of claim 11, wherein to evict using the memory eviction policy, the processing device further to:

responsive to the data allocation size limit not being met by the second eviction, perform a third eviction by evicting the DDM levels from the oldest DDM level to the newest DDM level; and responsive to the data allocation size limit not being met by the third eviction, perform a fourth eviction by evicting the IS levels from oldest IS level to the newest IS level.

13. The deduplication system of claim 11, the processing device further to:

perform inline deduplication of an incoming data block using the data remaining in the volatile memory in view of the eviction using the memory eviction policy.

14. The deduplication system of claim 13, wherein to perform the inline deduplication of the incoming data block using the data remaining in the volatile memory in view of eviction using the memory eviction policy, the processing device further to:

generate a hash value for the incoming data block;

compare the hash value for the incoming data block to the index summary in volatile memory to determine a match; and responsive to determining the match does not exist, discontinue the inline deduplication of the incoming data block.

15. The deduplication system of claim 14, wherein to perform the inline deduplication of the incoming data block using the data remaining in the volatile memory in view of eviction using the memory eviction policy, the processing device further to:

responsive to determining the match exists, compare the hash value for the incoming data block to the deduplication map in volatile memory rather than the deduplication map in the persistent storage resource.

16. A non-transitory computer-readable storage medium comprising instruction that, in response to execution by a processing device, cause the processing device to:
   store data comprising an index summary (IS) and a deduplication map (DDM) in volatile memory of a deduplication system, wherein the index summary comprises IS levels and accelerates lookup into the deduplication map, wherein the deduplication map comprises DDM levels and identifies locations of data blocks in a persistent storage resource of the deduplication system;
   detect that the stored data exceeds a data allocation size limit for the volatile memory; and
   evict, by the processing device, the data from the volatile memory using a memory eviction policy to meet the data allocation size limit, wherein evicting using the memory eviction policy comprises:
      perform a first eviction by evicting the DDM levels from an oldest DDM level to a newest DDM level until a first one of the data allocation size limit or a DDM threshold is met; and
      responsive to the data allocation size limit not being met by the first eviction, perform a second eviction by evicting the IS levels from an oldest IS level to a newest IS level until a first one of the data allocation size limit or IS threshold is met.

17. The non-transitory computer-readable storage medium of claim 16, wherein to evict using the memory eviction policy, the processing device further to:
   responsive to the data allocation size limit not being met by the second eviction, perform a third eviction by evicting the DDM levels from the oldest DDM level to the newest DDM level; and
   responsive to the data allocation size limit not being met by the third eviction, perform a fourth eviction by evicting the IS levels from oldest IS level to the newest IS level.

18. The non-transitory computer-readable storage medium of claim 16, the processing device further to:
   perform inline deduplication of an incoming data block using the data remaining in the volatile memory in view of the eviction using the memory eviction policy.

19. The non-transitory computer-readable storage medium of claim 18, wherein to perform the inline deduplication of the incoming data block using the data remaining in the volatile memory in view of eviction using the memory eviction policy, the processing device further to:
   generate a hash value for the incoming data block;
   compare the hash value for the incoming data block to the index summary in volatile memory to determine a match; and
   responsive to determining the match does not exist, discontinue the inline deduplication of the incoming data block.

20. The non-transitory computer-readable storage medium of claim 19, wherein to perform the inline deduplication of the incoming data block using the data remaining in the volatile memory in view of eviction using the memory eviction policy, the processing device further to:
   responsive to determining the match exists, compare the hash value for the incoming data block to the deduplication map in volatile memory rather than the deduplication map in the persistent storage resource.

* * * * *